US009426250B2

(12) United States Patent
Rasanen

(10) Patent No.: US 9,426,250 B2
(45) Date of Patent: Aug. 23, 2016

(54) METHOD, SYSTEM AND TERMINAL FOR MULTIMEDIA SESSION ESTABLISHMENT

(75) Inventor: Juha Rasanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1245 days.

(21) Appl. No.: 11/892,379

(22) Filed: Aug. 22, 2007

(65) Prior Publication Data

US 2008/0049725 A1 Feb. 28, 2008

Related U.S. Application Data

(60) Provisional application No. 60/840,452, filed on Aug. 28, 2006.

(51) Int. Cl.
| | |
|---|---|
| *H04L 12/66* | (2006.01) |
| *H04L 29/08* | (2006.01) |
| *H04L 29/06* | (2006.01) |

(52) U.S. Cl.
CPC .......... *H04L 67/303* (2013.01); *H04L 65/1006* (2013.01); *H04L 65/1083* (2013.01); *H04L 69/24* (2013.01); *H04L 65/1016* (2013.01)

(58) Field of Classification Search
CPC .................................................... H04L 67/303
USPC ....... 370/352, 248, 335, 328, 331, 338, 354, 370/401, 310; 455/466, 424, 432.1, 456.1, 455/450, 435.2, 461, 67.11, 418; 709/227, 709/230, 229, 204; 379/112.01, 201.12
See application file for complete search history.

(56) References Cited

U.S. PATENT DOCUMENTS

| | | | |
|---|---|---|---|
| 6,490,271 B1 * | 12/2002 | Erjanne ............... | H04W 72/085 370/329 |
| 6,628,954 B1 * | 9/2003 | McGowan et al. ........... | 455/461 |
| 7,243,159 B1 * | 7/2007 | Jayasimha et al. ........... | 709/237 |
| 7,844,268 B2 * | 11/2010 | Lim et al. .................. | 455/435.2 |
| 9,037,732 B2 * | 5/2015 | Zhu ...................... | H04L 65/1069 370/310 |
| 2002/0184373 A1 * | 12/2002 | Maes ...................... | G10L 15/30 709/228 |
| 2003/0035393 A1 * | 2/2003 | Sinnarajah et al. .......... | 370/335 |
| 2003/0064722 A1 * | 4/2003 | Frangione et al. ........... | 455/424 |
| 2004/0028037 A1 * | 2/2004 | Rasanen et al. .............. | 370/354 |

(Continued)

FOREIGN PATENT DOCUMENTS

| | | | | |
|---|---|---|---|---|
| EP | 1517571 A1 * | 3/2005 | ............ | H04W 24/02 |
| EP | 1553796 A1 * | 7/2005 | ............... | H04Q 7/20 |

(Continued)

OTHER PUBLICATIONS

Kutscher et a., "*Session Description and Capability Negotiation*", XP015023241, Feb. 20, 2005, pp. 1-61.

(Continued)

*Primary Examiner* — Parth Patel
(74) *Attorney, Agent, or Firm* — Mintz Levin Cohn Ferris Glovsky and Popeo, P.C.

(57) ABSTRACT

The described method, system and terminals may allow the sending capability information from a first terminal to a second terminal in a capability exchange performed without, or prior to, conducting a call between the first and second terminals. The capability information may include at least one of multimedia call related parameters such as a codec for example, or network capability related information. A session initiation protocol may be used for sending the multimedia call related parameters. A service change may thus rapidly be performed.

17 Claims, 5 Drawing Sheets

(56) References Cited

U.S. PATENT DOCUMENTS

| | | | |
|---|---|---|---|
| 2004/0156329 A1* | 8/2004 | Bck et al. | 370/328 |
| 2004/0185885 A1* | 9/2004 | Kock | 455/466 |
| 2004/0196796 A1* | 10/2004 | Bajko et al. | 370/310 |
| 2004/0213390 A1* | 10/2004 | Lazarus et al. | 379/112.01 |
| 2005/0058125 A1* | 3/2005 | Mutikainen | H04L 29/12292 370/354 |
| 2005/0060411 A1* | 3/2005 | Coulombe et al. | 709/227 |
| 2005/0064821 A1* | 3/2005 | Hedberg et al. | 455/67.11 |
| 2005/0141484 A1* | 6/2005 | Rasanen | H04L 65/103 370/352 |
| 2005/0163106 A1* | 7/2005 | Vaittinen | H04W 76/064 370/352 |
| 2005/0239458 A1* | 10/2005 | Hurtta | 455/432.1 |
| 2005/0255857 A1* | 11/2005 | Kim et al. | 455/456.1 |
| 2006/0047837 A1* | 3/2006 | Rissanen | 709/230 |
| 2006/0089966 A1 | 4/2006 | Stille et al. | |
| 2006/0194584 A1* | 8/2006 | Henttonen et al. | 455/450 |
| 2006/0218291 A1* | 9/2006 | Zhu et al. | 709/229 |
| 2006/0251020 A1* | 11/2006 | Olvera-Hernandez et al. | 370/331 |
| 2007/0002840 A1* | 1/2007 | Song | H04W 76/025 370/352 |
| 2007/0195802 A1* | 8/2007 | Kallio et al. | 370/401 |
| 2007/0218924 A1* | 9/2007 | Burman et al. | 455/466 |
| 2008/0043717 A1* | 2/2008 | Bellora et al. | 370/352 |
| 2008/0186952 A1* | 8/2008 | Lin et al. | 370/352 |
| 2008/0261578 A1* | 10/2008 | Maione et al. | 455/418 |
| 2009/0052415 A1* | 2/2009 | Ishii et al. | 370/338 |
| 2009/0055473 A1* | 2/2009 | Synnergren | 709/204 |
| 2009/0245496 A1* | 10/2009 | Maione et al. | 379/201.12 |

FOREIGN PATENT DOCUMENTS

| | | | |
|---|---|---|---|
| WO | WO 2005/055556 A1 | 6/2005 | |
| WO | WO 2007137615 A1 * | 6/2006 | H04M 3/42 |

OTHER PUBLICATIONS

International Search Report PCT/IB2007/052808 filed Jul. 13, 2007.

* cited by examiner

METHOD, SYSTEM AND TERMINAL FOR MULTIMEDIA SESSION ESTABLISHMENT

CROSS REFERENCE TO RELATED APPLICATION

This application claims priority of U.S. Provisional Patent Application Ser. No. 60/840,452, filed on Aug. 28, 2006, the entire contents of which are incorporated herein by reference.

FIELD

The invention generally relates to networks such as mobile networks and terminals allowing a service change.

BACKGROUND

Generally, when conducting a call or handling a connection from a terminal such as a mobile terminal or phone, a combinational service can be of advantage. As an example, such a combinational service can be created by adding, to a circuit-switched, CS, call, one or more packet-based sessions such as at least one IMS session, between the same participants, or vice versa. IMS stands for Internet Protocol, IP, multimedia subsystem. CS & IMS combinational services, CSICS, are specified in Draft 3GPP Rel-7 specifications TS 22.279V7.1.0 (2005-12): Combining CS and IMS sessions; Stage 2, and Stage 3, TS 22.279V1.0.0 (2006-02).

Such a combinational service allows a CSICS capable mobile or stationary terminal such as a user equipment, UE, to have simultaneous peer-to-peer CS and IMS communications which can be presented within one context to the user of the terminal. To achieve this, the communicating UEs shall indicate their CSICS capabilities to each other and be aware of the capabilities of the radio access network, i.e. whether the network supports simultaneous CS and packet-switched, PS, services. A capability exchange procedure, based on the exchange of SIP messages, can be applied between the communicating UEs.

A CS multimedia service with service change and fallback, SCUDIF, Service Change and UDI/RDI Fallback is known and described in 3GPP TS 23.172 V6.3.0 (2005-06): UDI/RDI fallback and service modification, Stage 2. UDI stands for unrestricted digital information, RDI for restricted digital information. UDI/RDI is part of Bearer Capability information passed to/from the network. An "information transfer capability" can be set to either UDI or RDI. The service change within SCUDIF means the capability of a user to change from e.g. a video call, or more generally a multimedia call including rich content such as visual or acoustical non-speech content, to a speech call and vice versa during an ongoing call. In SCUDIF, the change is signalled through the network to the far end terminal and requires bearer independent call control, BICC, signalling in the core network. However, such a service change does not work with Integrated Services Digital Network, ISDN, User Part, ISUP, or less developed signalling systems. Further, a problem with SCUDIF is that it requires BICC support throughout the core network. Enhancing ISUP to support SCUDIF may be considered but can be problematic.

When a CS video call is established between CSICS capable UEs, standard CS video call setup routines, including a slow inband codec negotiation, can be performed. It is desirable to speed up the establishment of a call or connection of this or other types.

SUMMARY

According to one or more embodiments of the invention, networks such as e.g. ISUP based mobile CS networks and terminals such as UEs can be boosted with other signalling mechanisms like e.g. SIP/IMS to support service change at multimedia calls. Multimedia call setup can be quickly performed in CS mobile networks. Mobile CS networks can be boosted or improved by applying a protocol for session initiation such as Session Initiation Protocol, SIP, and IMS. CS and IMS combinational services can thus effectively be provided.

The invention enables promoting or effectively using an IP based service or system such as IMS. The invention can provide synergies with the integration of legacy CS and IP multimedia, e.g. IMS, operations, boosting CS networks with SIP/IMS. Operators running ISUP based mobile core networks can benefit from introducing IMS.

The proposed mechanism offers a flexible way to support SCUDIF like service change in ISUP based networks. No changes in ISUP, or possible other signalling used in the CS network, are required.

As the IMS can be built or provided parallel to CS networks, legacy (e.g. ISUP based) mobile core networks can be used without need of updating them to support BICC. Further, the setup of a connection or call such as a CS video call setup can be effected rapidly.

According to an implementation, the invention provides at least one of a system, terminal and method comprising sending capability information from a first terminal to a second terminal in a capability exchange performed prior to or without conducting a call between the first and second terminals, and receiving, by the first terminal, capability information of the second terminal in the capability exchange, the capability information including multimedia call related parameters. The capability information received from the second terminal may be stored in the first terminal for later use in a subsequent service change. The capability information may be sent in a packet switched capability exchange performed prior to conducting e.g. a circuit switched call with the another terminal. In an embodiment, the capability information may be sent as part of a message of a session initiation protocol. The capability exchange may be an initial capability exchange performed before setting up a circuit switched call or a multimedia session such as an IMS session. The multimedia call related parameters of the capability information may preferably include at least one of the following parameters of information such as codec information for a circuit switched call, an indication that the respective terminal supports circuit-switched and internet protocol multimedia subsystem combinational services), multimedia call related issues, circuit-switched video call related issues, supported codecs, bitrates and logical channels, visited network capabilities related issues, and an indication on whether the visited network visited by the respective message sending terminal supports the change of channel type or service e.g. with an In-Call modification procedure. For initiating a service change, the first (alternatively the second) terminal may send a service change request to the second (alternatively the first) terminal, indicating the service change parameters, and initiates a modification at the network to which it is attached or connected. The modification may be an In-Call modification to modify a used traffic channel.

The term "conduct a call" as used in this specification intends to cover any case of establishing a new call bearer, or modifying the parameters/services of an existing call bearer (e.g. to modify the used traffic channel from video to speech only), or any other case of conducting a call or establishing a session.

The terminal preferably comprises a sender adapted to send capability information to another terminal, a receiver adapted to receive capability information of the another terminal, and a storage adapted to store the received capability information, the capability information including multimedia call related parameters. The terminal may also comprise a capability to find out and store capabilities of the visited network (such as e.g. the support of channel type change or service change e.g. with an In-Call modification procedure). Alternatively or additionally, the terminal may comprise means for sending capability information to another terminal, means for receiving capability information of the another terminal, and means for storing the received capability information, the capability information including multimedia call related parameters. The invention also provides a computer program product comprising program code means stored in a computer-readable medium, the program code means being adapted to perform any of steps of the disclosed method when the program is run on a computer or processor.

BRIEF DESCRIPTION OF THE DRAWINGS

In the following the invention will be described in more details with reference to the drawings.

DETAILED DESCRIPTION

Figure 1:
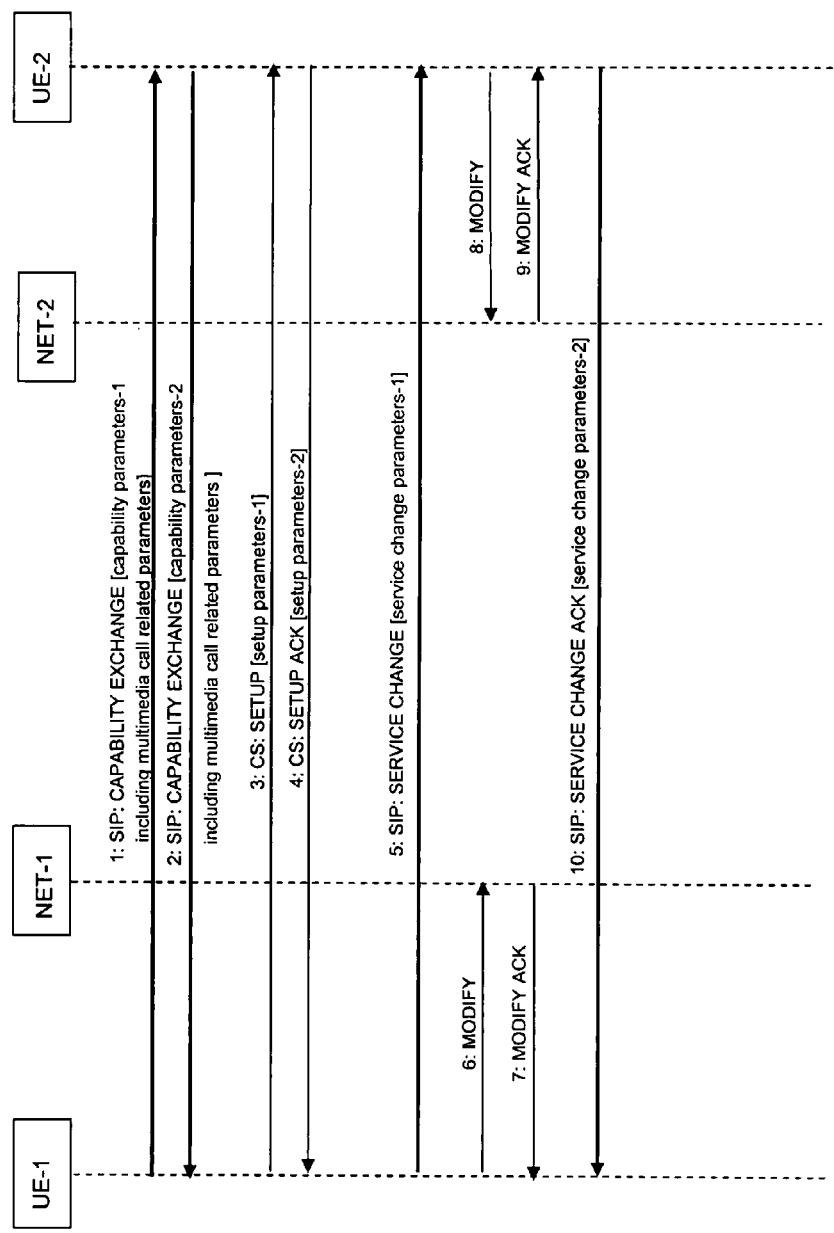
FIGS. 1 to 4 show implementations of methods and structures according to embodiments of the invention.

The invention generally relates to service change, core networks, connectivity, and/or IMS with CS bearers, i.e. CS & IMS combinational services.

According to one or more embodiments of the invention, a CSICS UE capability exchange mechanism, or more generally a protocol signalling such as SIP signalling, can be used for carrying connection related parameters, e.g. CS video or multimedia call related parameters, between the communicating terminals. This protocol signalling, preferably SIP signalling, can be used for replacing part of the CS network signalling. Thus, core Networks and/or connectivity can be enhanced.

According to one or more embodiments of the invention, within an initial capability exchange (such as e.g. described in TS 23.279 V7.1.0 (2005-12), subclause 8.2 and figure 8.2), the terminals such as UEs may find out that they both support CSICS. As described below, in one or more implementations of the invention, this initial capability exchange carries also parameter information such as CS codec information and possible other information, preferably such information that is conventionally negotiated within the H.245 inband negotiation in the CS video call establishment. Thus, such an inband negotiation is no longer needed.

The UEs preferably store the exchanged capability information and use it upon a subsequent CS video call establishment to replace the inband negotiation. These features not only accelerate setting up of the call but also reduce the amount of messages or information to be transferred when changing the service, and thus network load.

According to at least one embodiment, at least one or more, preferably each, of the UEs learn dynamically network capabilities during call/session establishments, store the learned network capability information and exchange it upon the CSICS capability exchange. In particular, the UE may find out during a call/session that the visited network supports a feature, e.g. a channel type change or a service change, and collect and store such information about features supported by the network, and send the information to another terminal within a capability exchange, and use the information for further calls/sessions established when the UE is in the same network. Alternatively the UE may receive an indication of a capability (e.g. to support channel type change or service change) of the visited network e.g. during a call/session setup signalling and store this information, send the information to another terminal within a capability exchange, and use the information for further calls/sessions established when the UE is in the same network.

In accordance with another embodiment or aspect of the invention, when a user adds a CS call to an ongoing multimedia session such as IMS session (refer to TS 23.279 V7.1.0 (2005-12), subclause 8.4 and figure 8.4-1), the UEs exchange their CSICS capabilities within protocol messages such as SIP INVITE and OK messages. According to embodiments, it is suggested that, in case of a, e.g. CS, multimedia call such as a CS video call, this capability exchange preferably also carries the CS codec information and possibly other information that is currently negotiated within the H.245 inband negotiation in the CS video call establishment.

The capability exchange may also carry network capability information the UE has dynamically learned earlier and stored, the information being e.g. that a certain visited (or home) network supports the change of channel type or service e.g. with an In-call modification procedure, and another network does not support such a capability. Alternatively, such capability information may be preconfigured or be exchanged between the UE and network by way of signalling.

The UEs store the exchanged information (updating possible earlier CSICS capability information) and use it upon a CS video call establishment for example to decide whether a CS video call with the change of channel type or service e.g. with an In-call modification procedure, i.e. with service change from video to speech and vice versa, is supported, and/or to replace the H.245 inband negotiation and speed up the call setup.

FIG. 1 illustrates a service change during an ongoing call between terminals such as UE-1, UE-2 capable of handling CS and multimedia connections such as CSICS capable UEs. If a multimedia call such as a video call has been setup using a prior CSICS service exchange and a CS call setup signaling, and possibly (but not necessarily) the service change capability (e.g. In-call modification support) has been verified with the CSICS capability exchange, the service change can be carried as follows and as shown in FIG. 1. A terminal UE-1 wanting to initiate a change (from video to speech or vice versa) sends a SIP message to the other terminal UE-2, indicating a service change and including possible related parameters. Both UEs initiate a modification with a MODIFY message at their networks NET-1, NET-2. The CS networks (if/when supporting this feature) accept the modification and assign or adapt the radio access bearers for the new service. The core network bearer between the originating and terminating networks NET-1, NET-2 preferably stays unchanged (e.g. 64 kbit/s) as with the standardized SCUDIF service. The terminal UE-2 that received the service change request responds with a SIP OK message.

The same procedure is carried out in a case of adding to an ongoing speech call a multimedia call such as CS video call, e.g. by providing an IMS session set- up with media requiring resource reservation.

As shown in FIG. 1, the terminals UE-1 and UE-2 indicate their capabilities to each other by exchanging SIP messages, e.g. message 1:SIP: CAPABILITY EXCHANGE [capability parameters-1 including multimedia call related parameters] sent from UE-1 to UE-2 indicating the capabilities of UE-1, and message 2:SIP: CAPABILITY EXCHANGE [capability parameters-2 including multimedia call related parameters] sent from UE-2 to UE-1 indicating the capabilities of UE-2. The capabilities may comprise at least one or more or all of the following information:

an indication that the respective terminal supports CSI (CS & IMS combinational services), multimedia call related issues, e.g. CS video call related issues, like supported codecs, bitrates, data rates, and/or use of logical channels, and logical channels, and visited network capabilities related issues like an indication on whether the visited network visited by the respective message sending terminal supports the change of channel type or service e.g. with an In-Call modification procedure.

The terminal UE-1 initiates a CS call (e.g. a video call) by sending a SETUP message 3 to the network (addressing the terminal UE-2). The terminal UE-2 accepts the CS call setup and sends back an acknowledgement message 4 such as SETUP ACK. When UE-1 wants to change the used service, e.g. in case of a video call UE-1 wants to change the call to a speech only call, a service change is initiated. To initiate the change UE-1 sends a change request message 5 such as a SIP SERVICE CHANGE message to UE-2, indicating the service change parameters.

Further, UE-1 initiates an In-Call modification in its visited network NET-1, to modify the used traffic channel e.g. from video, to speech only, by sending a MODIFY message 6 to the network NET-1. The network NET-1 carries out and accepts the modification and returns message 7 acknowledging the modification, MODIFY ACK.

After receiving the SERVICE CHANGE message 5, UE-2 initiates a modification procedure in its visited network NET-2, to modify the used traffic channel from video to speech only, by sending a MODIFY message to the network, message 8. The network NET-2 carries out and accepts the modification by returning message 9.

After receiving an acknowledgement to the MODIFY request 8 in the ACK message 9, UE-2 acknowledges the SERVICE CHANGE message 5 by sending a SERVICE CHANGE ACK message 10 to UE-1.

If the UE does not know whether the network to which the UE is attached (here also called visited network), supports the change of channel type or service e.g. with an In-call modification procedure (i.e. there has been no such capability information available upon the CSICS capability exchange), the service change may fail when one or all of the involved networks do not support the change. This case is described and shown in FIGS. 2 and 3.

Figure 2:
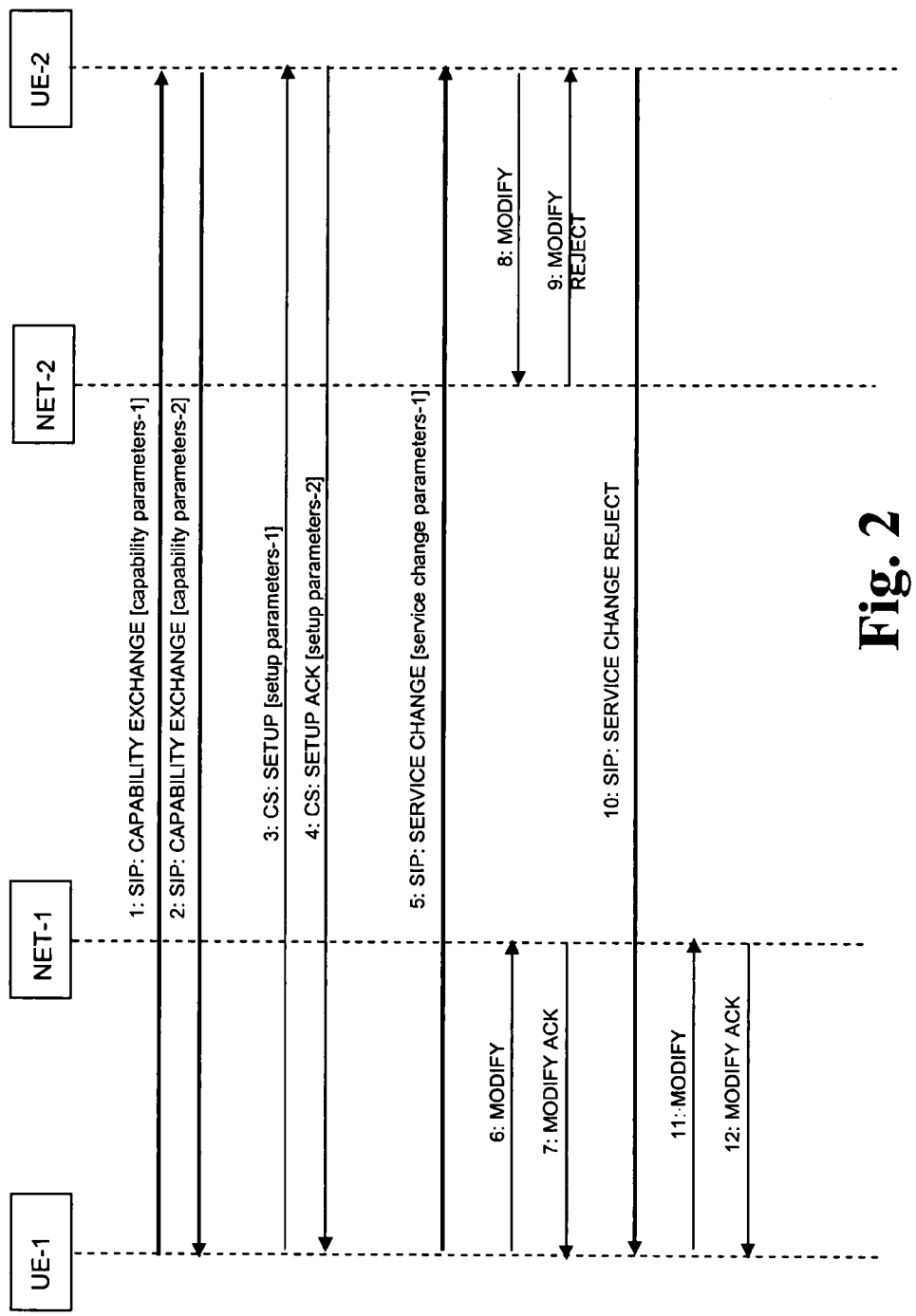

The messages 1 to 8 shown in FIG. 2 can be identical with the messages 1 to 8 shown in, and described above with reference to, FIG. 1.

The UE-1 wanting to initiate the change (from video to speech or vice versa) sends a SIP message 1 to the other UE-2, indicating a service change and including possible related parameters. Both terminals UE-1, UE-2, initiate a modification with a MODIFY message 6, 8 at their networks.

The CS network NET-2 not supporting the modification, i.e. the change of channel type or service, rejects the MODIFY request 8 and returns a modify reject message 9 to UE-2. Both UEs and networks return to the original service, applying a new MODIFY request or service change request if necessary.

In steps 1, 2, the terminals UE-1 and UE-2 indicate their capabilities to each other by exchanging SIP messages (messages 1 and 2). The capabilities may comprise an indication that the terminal supports CSI (CS & IMS combinational services), and CS video call related issues like supported codecs, bitrates and logical channels, and visited network capabilities related issues like an indication on whether the visited network supports the change of channel type or service e.g. with an In-Call modification procedure. But at least one of the terminals (e.g. UE-2 receiving the SERVICE CHANGE request 5) does not know that its network NET-2 does not support the required change of channel type or change of service.

The terminal UE-1 initiates a CS call (e.g. a video call) by sending a SETUP message to the network (addressing the terminal UE-2), message 3. Terminal UE-2 accepts the CS call setup and sends back an acknowledgement (SETUP ACK), message 4. The terminal UE-1 now wants to change the used service, e.g. in case of a video call UE-1 wants to change the call to a speech only call. To initiate a change the terminal UE-1 sends a message 5, e.g. a SIP SERVICE CHANGE request message, to the terminal UE-2. UE-1 initiates an In-Call modification in its visited network NET-1, to modify the used traffic channel from video to speech only, by sending a MODIFY message to the network, message 6. The network NET-1 accepts the modification and returns message 7.

After receiving the SERVICE CHANGE request message (message 5), UE-2 initiates an In-Call modification in its visited network NET-2, to modify the used traffic channel from video to speech only, by sending a MODIFY message 8 to the network NET-2. The network NET-2 does not accept the UE-initiated modification (e.g. because there was no indication of a possible later modification in the call setup signaling). The network NET-2 thus rejects the modification request by sending a MODIFY REJECT, message 9.

After receiving the REJECT response to the MODIFY request, message 9, UE-2 rejects the SERVICE CHANGE request of message 5 by sending a SERVICE CHANGE REJECT message 10 to the UE-1. In response to this rejection, the UE-1 initiates a modification back to the service preceding the previous modification (in this example from speech only back to video) by sending a MODIFY message 11 to the network NET-1. The network NET-1 accepts the modification and returns an acknowledgment message 12.

Figure 3:
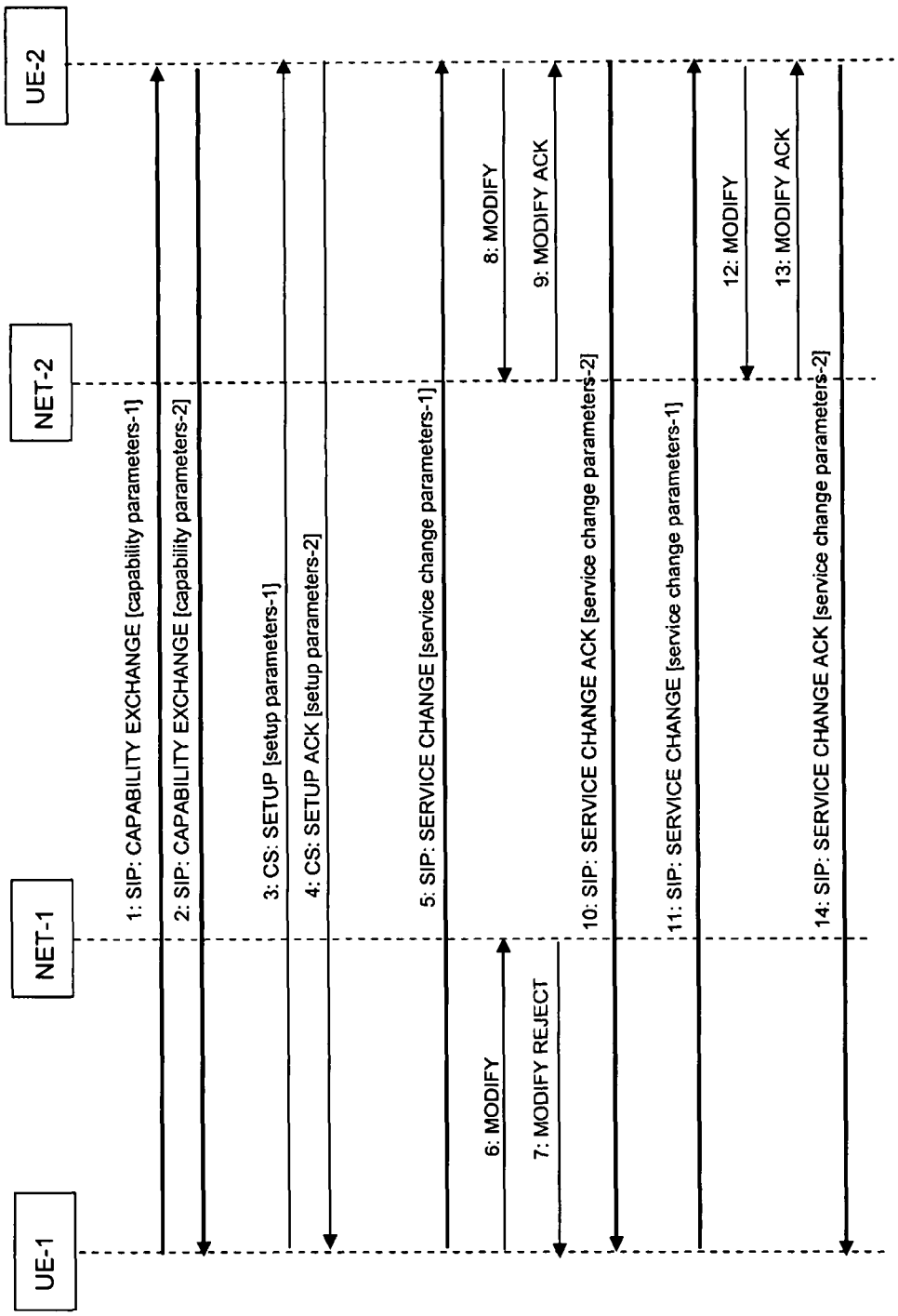

FIG. 3 illustrates another embodiment in which the network NET-1 does not support a desired service change. The structure, steps and the messages 1 to 6 and 8 shown in FIG. 3 can be identical with the structure, steps and the messages 1 to 6 and 8 shown in, and described above with reference to, FIG. 1, and will therefore not be detailed again. In step 7, the network NET-1 does not accept the UE-initiated in-call modification requested in message 6 (e.g. because there was no indication of a possible later modification in the call setup signalling, or the network does not have sufficient resources, or does not support the requested service, etc.). The network NET-1 rejects the modification request by sending a MODIFY REJECT message 7. Thus, the previous service is continued in NET-1.

Contrary thereto, after receiving the SERVICE CHANGE request message (message 5), the UE-2 successfully initiates an In-Call modification in its visited network, to modify the used traffic channel e.g. from video to speech only, by sending a MODIFY message 8 to the network NET-2. After receiving, from the NET-2, the acknowledgement message 9 to the MODIFY request, the UE-2 acknowledges the SERVICE CHANGE request message 5 by sending a SERVICE CHANGE ACK message 10 to UE-1.

After receiving the MODIFY REJECT response message 7 to the MODIFY request message 6, the UE-1 sends a further SIP SERVICE CHANGE message 11 to UE-2, to change the service back to the previous service (from speech only to video in this example). In response to the SERVICE CHANGE request message 11, UE-2 initiates an In-Call modification in its visited network NET-2, to modify the used traffic channel back, i.e. from speech only to video, by sending a MODIFY message 12 to the network. The network NET-2 accepts the modification, message 13. After receiving an acknowledgement to the MODIFY request in the ACK message 13, the UE-2 acknowledges the SERVICE CHANGE request message 11 by sending a SERVICE CHANGE ACK message 14 to UE-1.

Figure 4:
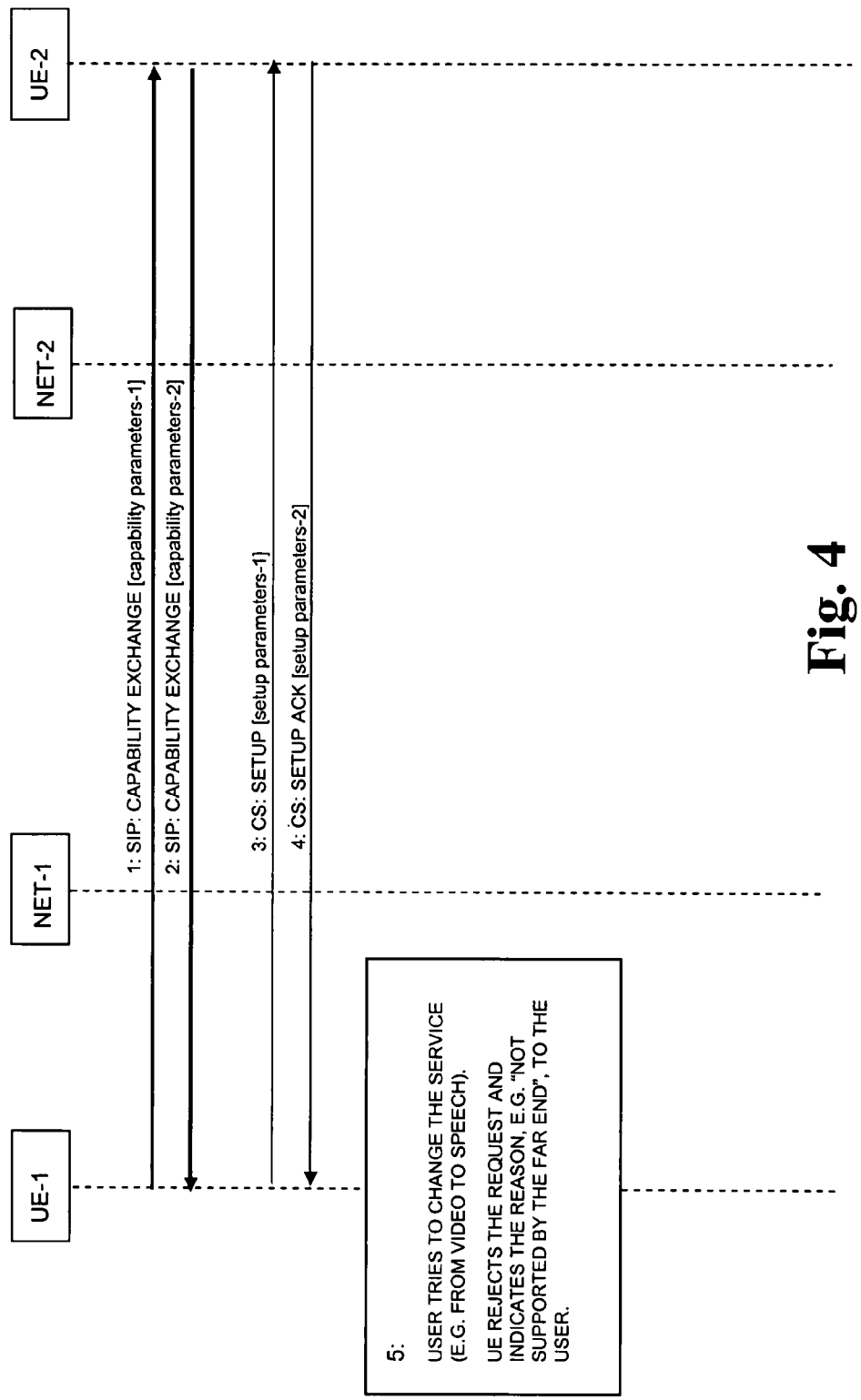

FIG. 4 shows another embodiment in which a service change request of a user is checked by a user equipment itself before sending messages to the networks.

The structure, steps and messages 1 to 4 shown in FIG. 4 can be identical with the structure, steps and messages 1 to 4 shown in, and described above with reference to, FIG. 1. The terminals UE-1 and UE-2 indicate their capabilities to each other by exchanging SIP messages 1 and 2. The capabilities may comprise an indication that the terminal supports CSI (CS & IMS combinational services), and CS video call related issues like supported codecs, bitrates and logical channels, and visited network capabilities related issues like an indication on whether the visited network supports the change of channel type or service e.g. with an In-Call modification procedure or not. At least one of the terminals (e.g. UE-1) gets an indication that the other UE's network does not support a required In-Call modification. In this example, the NET-2 does not support a desired service change.

Terminal UE-1 initiates a CS call (e.g. a video call) by sending a SETUP message to the network (addressing the terminal UE-2), message 3. Terminal UE-2 accepts the CS call setup and sends back an acknowledgement (SETUP ACK), message 4.

When the user of terminal UE-1 now wants to change the used service, e.g. in case of a video call the user of terminal UE-1 wants to change the call to a speech only call, the terminal UE-1 checks the availability of the requested service change capability or changed service in the involved networks and UEs. This check may be carried out by checking the stored capability parameters received in message 2, or using other information stored in or accessible by the UE-1. When detecting that the requested service is not possible due to restrictions of the terminals (UEs) or networks or the like, the terminal UE-1 does not start any service change or channel modify action towards the network. Instead thereof, the UE-1 may indicate to the user of the terminal UE-1 that the operation of the requested service change is not possible, possibly indicating a reason such as "requested service not possible due to restrictions e.g. at the far end".

Figure 5:
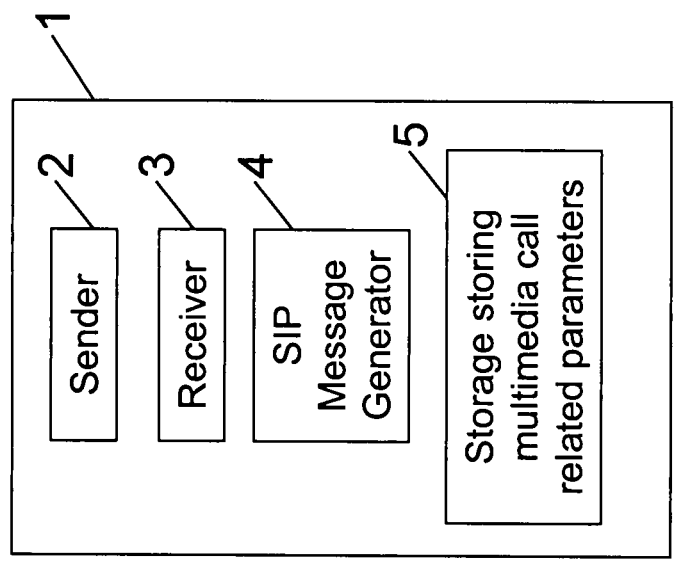
FIG. 5 shows an embodiment of a terminal in accordance with the invention.

FIG. 5 shows an embodiment of a terminal 1 in accordance with the invention. The terminal 1 can be the user equipment UE-1 or UE-2 shown in FIGS. 1 to 4. The terminal 1 comprises a sender 2 for sending its capabilities and other information to the network or other terminals, a receiver 3 for receiving capabilities and other information from the network or other terminals, a SIP message generator 4 for generating the respective SIP messages as mentioned above, and a storage 5 for storing received or collected or configured capability parameters, including multimedia call related parameters as mentioned above, of other terminals such as UE-2.

In the basic solution new parameters are added to the CSICS capability exchange shown in FIGS. 1 to 4. The terminals are adapted to include these new parameters into protocol messages such as SIP when conducting an initial capability exchange.

Preferably, the UE dynamically collects/learns information about the network.

If the service modification is supported as described above, the CS network (mobile switching center, MSC, or mobile service system, MSS) may be adapted to accept a MODIFY operation without a prior dual BCIE exchange at the setup phase. This is a modification of an existing feature for a new purpose at the MSC/MSS.

According to embodiments of the invention, the establishment of circuit switched video call or multimedia call between two terminals can become faster by adding required multimedia information, e.g. H.245 related information, into SIP signalling that can be executed prior to an actual call establishment attempt and stored by the terminals. The setup delay of a CS multimedia call can be reduced. Embodiments of the present invention support a parameter negotiation such as codec negotiation in conjunction with an outband signaling (e.g. during capability exchange outside of any call conducted between the terminals). No time-consuming inband negotiation is needed. A codec negotiation is still possible.

The invention introduces an alternative mechanism to trigger service change without use of SCUDIF in the network. When detecting that there are preventive issues that can prevent service change (e.g. terminal or network not supporting service change, or improper information transfer capability in the network, or echo control incapabilities in the network), the service change can be suppressed or switched back to the previous service.

A feature of at least one of the embodiments of the invention is to reserve an e.g. 64 kbit/s UDI/RDI bearer through the core network, as it is done also when SCUDIF is used. In this case there will be no echo cancellers. The described capability negotiation provided in embodiments of the invention can cover also SCUDIF's fallback feature, i.e. called UE indicating fallback to speech (or multimedia).

LIST OF ABBREVIATIONS USED

3 GPP $3^{rd}$ generation partnership project
BICC Bearer independent call control
CN Core network
CS Circuit switched
CSICS CS IMS combinational service
IMS IP multimedia subsystem
IP Internet protocol
ITU-T Telecommunication standardization sector of International telecommunication union
MSC Mobile services switching centre
MSS MSC server
P-CSCF Proxy call session control function
SCUDIF Service change and UDI/RDI fallback
SDP Session description protocol SIP Session initiation protocol
UE User equipment Embodiments of the invention may comprise, without being restricted thereto, at least one of the following claims.

What is claimed:

1. A method comprising:
   sending, by a first terminal, capability information of the first terminal to a second terminal, wherein the sending occurs without, or prior to, a circuit-switched call conducted between the first terminal and the second terminal;
   receiving, at the first terminal, capability information of the second terminal;
   establishing the circuit-switched call between the first terminal and the second terminal; and
   initiating, by the first terminal, a service change during the circuit-switched call conducted between the first terminal and the second terminal, wherein the first terminal initiates the service change by at least sending, to the second terminal, a service change request using a session initiation protocol during the circuit-switched call, wherein the capability information of the first terminal and the second terminal comprises multimedia call related parameters and an indication that a visited network supports a service change between a speech only call and a multimedia call.

2. The method according to claim 1, further comprising storing the capability information of the second terminal.

3. The method according to claim 1, wherein the circuit-switched call comprises a speech only call or a multimedia call.

4. The method according to claim 1, wherein the capability information comprises at least one of:
   a codec information for the circuit-switched call;
   an indication that a respective terminal supports circuit-switched and internet protocol multimedia subsystem combinational services;
   multimedia call information;
   circuit-switched video call information;
   supported codecs;
   bitrates;
   data rates;
   logical channels;
   visited network capability information ; and
   an indication that a visited network supports a channel type change.

5. The method according to claim 1,
   wherein the service change request identifies service change parameters, and
   wherein initiating the service change further comprises initiating a modification at a network connected to the first terminal.

6. The method according to claim 5, wherein the modification is an in-call modification to modify a used traffic channel.

7. The method according to claim 1 further comprising:
   receiving, at the first terminal, service change parameters in a session initiation protocol service change acknowledge message from the second terminal, wherein the service change parameters comprise at least a change of the used traffic channel.

8. The method according to claim 1, wherein the negotiating the multimedia codec parameter includes an H.245 protocol.

9. The method according to claim 1, further comprising negotiating, by the first terminal and the second terminal, a multimedia codec parameter for a multimedia call, and wherein the negotiating occurs prior to establishing the circuit-switched call.

10. An apparatus comprising:
    at least one processor; and
    at least one memory including computer program code, the at least one processor, the at least one memory, and the computer program code configured to cause the apparatus to at least:
    send capability information to another apparatus in a packet switched capability exchange performed prior to conducting a circuit-switched call with the other apparatus;
    receive capability information of the other apparatus;
    establish the circuit-switched call with the other apparatus; and
    initiate a service change during the circuit-switched call with the other apparatus, wherein the apparatus initiates the service change by at least sending, to the other apparatus, a service change request using a session initiation protocol during the circuit-switched call conducted with the other apparatus, wherein the capability information of the apparatus and the other apparatus comprises multimedia call related parameters and an indication that a visited network supports a service change between a speech only call and a multimedia call.

11. The apparatus according to claim 10, wherein the capability information comprises at least one of:
    a codec information for the circuit-switched call;
    an indication that a respective apparatus supports circuit-switched and internet protocol multimedia subsystem combinational services;
    multimedia call information;
    circuit-switched video call information;
    supported codecs;
    bitrates;
    data rates;
    logical channels;
    visited network capability information; and
    an indication that a visited network supports a channel type change.

12. The apparatus according to claim 10, wherein the service change request identifies services change parameters, wherein initiating the service change further comprises initiating a modification at a network connected to the apparatus, and wherein the modification comprises an in-call modification to modify a used traffic channel.

13. The apparatus according to claim 10, wherein the apparatus is further configured to store the capability information of the other apparatus.

14. The apparatus according to claim 10, further
    configured to receive service change parameters in a session initiation protocol message from the other apparatus, wherein the service change parameters comprise at least a change of the used traffic channel.

15. The apparatus according to claim 10, wherein the negotiating the multimedia codec parameter includes an H.245 protocol.

16. A method comprising:
    sending capability information of a first terminal to a second terminal, wherein the sending occurs without, or prior to, a circuit-switched call conducted between the first terminal and the second terminal, and wherein the capability information indicates that the first terminal supports a packet switched service capability and a circuit switched service capability;

receiving, at the first terminal, capability information of the second terminal;

establishing the circuit-switched call between the first terminal and the second terminal;

initiating, by the first terminal, a service change during the circuit-switched call between the first terminal and the second terminal, wherein the first terminal initiates the service change by at least sending, to the second terminal, a service change request using a session initiation protocol during the circuit-switched call, wherein the capability information of the first terminal and the second terminal comprises multimedia call related parameters and an indication that a visited network supports a service change between a speech only call and a multimedia call.

17. The method according to claim 16, wherein the negotiating the multimedia codec parameter includes an H.245 protocol.

* * * * *